United States Patent [19]
Kindrick

[11] Patent Number: 5,731,526
[45] Date of Patent: *Mar. 24, 1998

[54] SYSTEM FOR DISPLAYING THE AMOUNT OF FLUID DISPENSED FROM A HAND-HELD SPRAYER

[76] Inventor: Dudley R. Kindrick, 7705 Plain City-Georgesville Rd., Plain City, Ohio 43064

[ * ] Notice: The term of this patent shall not extend beyond the expiration date of Pat. No. 5,540,102.

[21] Appl. No.: 668,406

[22] Filed: Jun. 21, 1996

Related U.S. Application Data

[63] Continuation-in-part of Ser. No. 327,014, Oct. 21, 1994, Pat. No. 5,540,102, which is a continuation-in-part of Ser. No. 950,063, Sep. 23, 1992, abandoned.

[51] Int. Cl.[6] .................................................. G01F 1/74
[52] U.S. Cl. ............................ 73/861; 222/36; 222/39; 340/870.02
[58] Field of Search .................. 73/861, 861.77, 73/861.78, 198, 3; 377/39, 53, 2, 21; 364/465, 509, 510; 222/23, 36, 39; 340/870.02

Primary Examiner—George M. Dombroske
Assistant Examiner—Harshad Patel
Attorney, Agent, or Firm—Mueller and Smith, LPA

[57] ABSTRACT

A system for displaying a units categorized value corresponding to the cumulative amount of fluid dispensed from a delivery system having a hand-held nozzle with a trigger actuable by an operator to admit fluid through the nozzle. A display is mounted upon an enclosure to be responsive to a control signal for displaying visually perceptible indicia in selected increments corresponding to the units categorized value. A processor is provided within the enclosure for deriving the control signal. The processor is responsive in a calibration mode to the actuation of the trigger of the hand-held nozzle to derive a calibration count value corresponding to the time elapsed in dispensing a predetermined unit amount of fluid. When this trigger is actuated, a flow monitor at a fluid tank source detects the flow of fluid and broadcasts the presence of the fluid flow condition to a receiver mounted at the enclosure. The processor is further responsive in a run mode to derive an incrementing run count value corresponding to the time elapsed in dispensing an amount of fluid, and to compare the incrementing run count value and the calibration count value for deriving the control signal incrementing the units categorized value when the run count value equals the calibration count value.

14 Claims, 6 Drawing Sheets

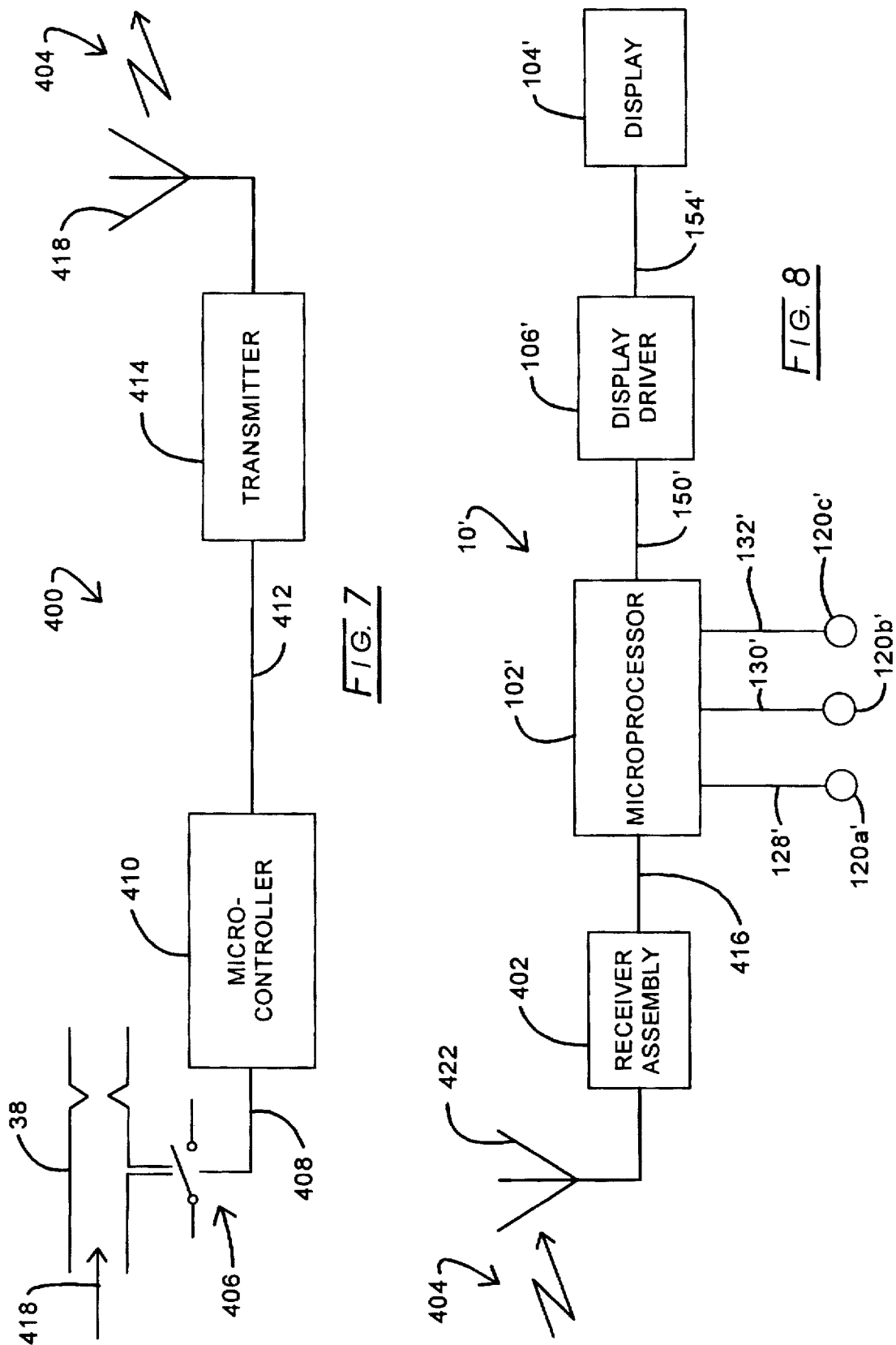

SYSTEM FOR DISPLAYING THE AMOUNT OF FLUID DISPENSED FROM A HAND-HELD SPRAYER

CROSS-REFERENCE TO RELATED APPLICATION

This application is a continuation-in-part of U.S. application Ser. No. 08/327,014, filed Oct. 21, 1994, now U.S. Pat. No. 5,540,102, issued Jul. 30, 1996, which, in turn, is a continuation-in-part of application Ser. No. 07/950,063, filed Sep. 23, 1992, now abandoned.

BACKGROUND OF THE INVENTION

The present invention relates to a system for monitoring the dispensing of fluids, such as lawn care chemicals and the like, from a hand-held sprayer.

Lawn care operators have long been concerned with the accurate application of lawn chemicals both for the proper treatment of the lawn and a concern for the environment, and for the economic savings which result from avoiding the over-application of expensive treatment chemicals. The treatment of lawns for fertilization and/or weed and pesticide control typically involves the dispensing of treatment chemicals from a truck directly onto the lawn undergoing treatment. Within the truck, a pump is provided to convey the chemicals from a tank or other reservoir through a length hose terminating in a hand-held nozzle or sprayer. The nozzle is provided as having a trigger which is actuable by an operator to admit fluid therethrough. The operator, who carries the nozzle while walking over the lawn, controls the application of the chemicals and ensures that all areas of the lawn are treated adequately.

Initially, conventional flow meters having in-line sensors were proposed to meter the amount of treatment chemicals being applied by the operator. Such meters, however, have been proven to lack the ruggedness necessary for lawn care applications, and to be adversely affected by the fertilizers, insecticides, and other caustic chemicals used in the lawn care industry. Thereafter, the introduction of a lightweight, battery operated flow meter, made possible through the technology of complementary metal oxide semiconductors (CMOS), was expected to satisfy the concerns of lawn care professionals. Such a meter is described in U.S. Pat. No. 4,700,579 to incorporate a turbine having metal slugs embedded in the vanes thereof. A magnetic pick up switch is mounted in association with the turbines to detect the rotation of the vanes as magnetic pulses which are converted to a count in a CMOS counter. This count ultimately is provided as a readable output on a digital counter.

Although the above-described flow meter represented an important advancement in the an of liquid delivery systems, it is disadvantaged in that the turbine thereof must be mounted within the delivery line. For lawn care applications, the meter is mounted either within the nozzle or on the lawn chemical truck between the pump and the hose reel. Mounting the meter in the nozzle, however, increases the weight thereof and proportionally increases the fatigue of the operator. Such placement additionally subjects the meter to abuse when, for example, the hose is reeled into the lawn care track causing the nozzle to bounce along the ground striking trees, rocks, fire hydrants, and the like. Although alternatively mounting the meter within the truck between the pump and the hose reel avoids much of the wear and tear on the meter, the operator is inconvenienced in having to return to the truck each time he or she wishes to check the amount of fluid which was delivered.

Moreover, the flow meters heretofore known in the an contain moveable pans which come into contact with the caustic lawn treatment chemicals. Over time, such contact corrodes vanes, beatings, and other pans, and eventually necessitates the replacement of the meter. The meters previously used therefore have lacked the dependability required for industrial applications. Additionally, the use of such meters was viewed as inconvenient in that different meters generally were required depending upon the chemical being applied and on the application rate thereof. For example, it was not uncommon for an operator to change flow meters when the application rate or pressure of was increased or decreased.

In view of the foregoing, it may be seen that there has existed and remains a need for an improved flow meter for lawn care applications. The preferred meter would be lightweight, durable, reliable, economical, and easy to operate, and would operate for any flow rate or pressure without having to contact the chemicals being dispensed. It is apparent that such a meter would be well-received, and would represent an important advancement to the lawn care and landscape industries.

SUMMARY

The present invention is addressed to a system for displaying a units categorized value corresponding to the cumulative amount of fluid dispensed from a delivery system having a hand-held nozzle with a trigger actuable by an operator to admit fluid through the nozzle. The system includes a display which may be mounted, for example, within the direct view of a operator who then may better monitor and adjust the delivery rate of the fluid being dispensed. The system additionally provides for a calibration function corresponding to the time elapsed in dispensing a predetermined unit amount of fluid which is independent of the pressure and flow rates of the flow rate of the fluid dispensed. Consequently, the system may be used in many delivery systems and is especially suited for lawn care treatment applications.

Moreover, in providing for a run function which is based on the time elapsed in dispensing the fluid, which run function then is compared to the calibration function to derive the cumulative amount of fluid dispensed, the system of the present invention operates with no moving parts which would be subject to wear or damage. Advantageously, this operation obviates the need to have turbine or other element come into direct contact with the fluid flow. The performance of the system therefore is not subject to the adverse effects of corrosion, and accordingly is more reliable and consistent than the meters heretofore known in the art. A time savings also is realized in that the system need not be cleaned after each use. In a preferred embodiment, the system is provided to be portably worn on the person of the operator such that the system components are less likely to be damaged than if mounted on the end of a nozzle which may be bounced along the ground during retrieval.

A feature of the invention resides in the utilization of dual modules for the system. With this arrangement, the portable flow analyzer module which is carried by the operator has an R.F. receiver or the like mounted upon it which functions to activate or actuate the module upon receipt of a broadcasted message signal indicating that fluid is flowing. This signal is generated from a transmission module mounted at the tank storage source of the fluid which responds to the presence of a fluid flow to transmit that information, for example, utilizing an R.F. link. Additional information which may be transmitted from this transmission module is the total time elapsed of fluid flow. Such an arrangement, for example, accommodates for any lost signal which may have occurred at the R.F. link through the provision to the operator of the total amount of time elapsed during which fluid was being distributed.

Another object of the invention is to provide a system for displaying a units categorized value corresponding to the cumulative amount of fluid dispensed from a delivery system having a tank storage source of the fluid, a fluid conduit, and a hand-held nozzle with a trigger actuable by an operator to admit fluid through the nozzle from the conduit. The system includes a transmitter module having a fluid flow monitoring transducer positioned at the source and which is responsive to the flow of fluid through the conduit to provide a fluid flow signal. A controller is positioned at the source and is responsive to the flow signal to derive a message signal, and a transmitter assembly completes the transmitter module, and is responsive to the message signal to effect the broadcasting thereof to establish a broadcast link. Further provided is a portable flow analyzer module which includes an enclosure and a receiver assembly mounted upon the enclosure which is responsive to the broadcasted message signal to complete the broadcast link and derive a digital message signal corresponding therewith. A display mounted upon the enclosure is responsive to a control signal for displaying visually perceptive indicia in selected increments corresponding to the units categorized value. Additionally, a control circuit is provided within the enclosure for deriving a control signal. That control circuit includes a first circuit responsive to the digital message signal to generate a clock output. A second circuit is provided which is responsive in a calibration mode to the clock output for generating a calibration count value corresponding to the time elapsed in dispensing a predetermined amount of fluid. A third circuit responds in a run mode to the clock output for generating an incrementing run count value corresponding to the time elapsed in dispensing an amount of fluid, and a comparator circuit is connected to the second and third circuits and to the first display for comparing the incrementing run count value and the calibration count value to derive the control signal incrementing the units categorized value when the run count value equals the calibration count value.

Another feature of the invention provides a system for displaying a units categorized value corresponding to the cumulative amount of fluid dispensed from a delivery system having a tank storage source of the fluid, a fluid conduit, and a handheld nozzle with a trigger actuable by an operator to admit fluid through the nozzle from a conduit. The system includes a transmitter module which has a fluid flow monitoring transducer positioned at the source and is responsive to the flow of fluid through the conduit to provide a flow signal. A controller is positioned at the source and is responsive to the flow signal to derive a message signal. Further, the module includes a transmitter assembly responsive to the message signal to effect the broadcasting thereof to establish a broadcast link. A portable flow analyzer module is provided which includes an enclosure and a receiver assembly mounted upon the enclosure and which is responsive to the broadcasted message signal to complete the broadcast link and provide a digital message signal corresponding therewith. A display is mounted upon the enclosure which is responsive to a control signal for displaying visually perceptive indicia in selected increments corresponding to the units categorized value. A processor is provided within the enclosure for deriving the control signal, this processor is responsive in a calibration mode to the digital message signal to derive a calibration count value corresponding to the time elapsed in dispensing a predetermined unit amount of fluid. It further is responsive in a run mode to derive an incrementing run count value corresponding to the time elapsed in dispensing an amount of fluid. The processor further compares the incrementing run count value and the calibration count value for deriving the control signal incrementing the unit's categorized value when the run count value equals the calibration count value.

As another feature of the invention, a method for displaying a units categorized value corresponding to the cumulative amount of fluid dispensed from a delivery system having a tank source of the fluid, a fluid conduit, and a hand-held nozzle with a trigger actuable by an operator to admit fluid through the nozzle from the conduit, the units categorized value being displayed in selected increments as visually perceptive indicia. The method includes the steps of:

providing a transmitter module including a fluid flow monitoring transducer positioned at the source and which is responsive to the flow of fluid through the conduit to provide a flow signal, a controller positioned at the source, responsive to the flow signal to derive a message signal, and a transmitter assembly responsive to the message signal to effect the broadcasting thereof to establish a broadcast link;

providing a portable flow analyzer module having a receiver assembly responsive to the broadcasted message signal to complete the broadcast link and derive a digital message signal corresponding therewith to actuate the analyzer module into an operating state;

carrying out a first actuation of the trigger to establish the broadcast link;

deriving responsive to the first actuation of the trigger a calibration count value corresponding to the time elapsed in dispensing a predetermined unit amount of fluid;

carrying out a second actuation of the trigger to re-establish the broadcast link;

deriving responsive to the second actuation of the trigger an increment run count value corresponding to the time elapsed in dispensing an amount of fluid;

comparing the incrementing run count value and the calibration count value; and incrementing the units categorized value when the incrementing run counter value output equals the calibration count value output.

The invention, accordingly, comprises the combination of elements and arrangement of parts and steps which are exemplified in the following detailed description.

For a fuller understanding of the nature and objects of the invention, reference should be had to the following detailed description taken in connection with the accompanying drawings.

BRIEF DESCRIPTION OF THE DRAWINGS

FIG. 7 is a block schematic diagram showing the transmission module of the invention; and FIG. 8 is a schematic block diagram showing the receiver assembly as associated with the microprocessor and readout components of the portable flow analyzer module of the invention.

DETAILED DESCRIPTION

Figure 1:
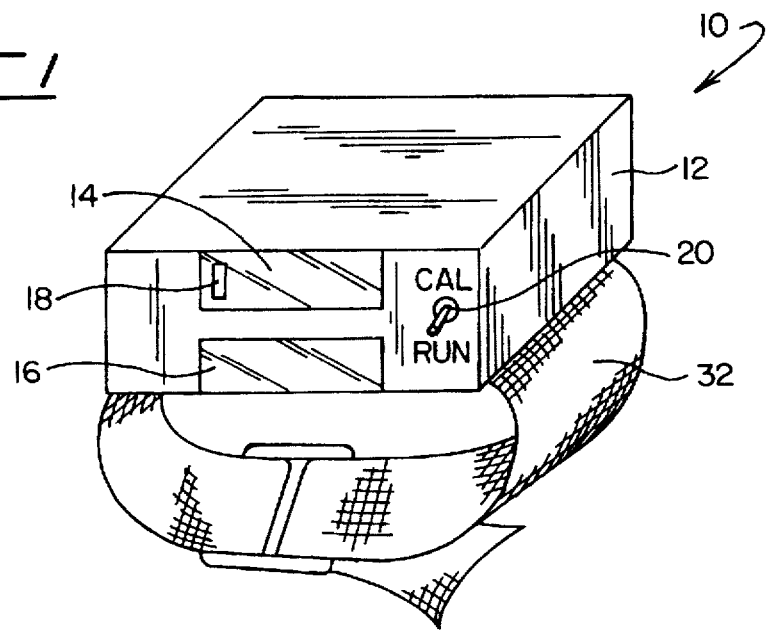
FIG. 1 is a perspective view an embodiment of a device in accordance with the system of the present invention for monitoring the amount of fluid dispensed from a delivery system.

Referring to the figures wherein like reference numerals are used to designate like parts, a device in accordance the system of the present invention for monitoring the amount, i.e., volume, of fluid dispensed from a delivery system is shown generally in FIG. 1 to include a portable flow analyzer module 10 having a housing or enclosure, 12, upon which is mounted a pair of multi-digit displays, 14 and 16. Displays 14 and 16 may be of a liquid crystal type having up counter circuitry such as Trumeter model 7000A. Display 14 is shown to be resetable via a push-button reset switch, 18, and is provided to show indicia in selected increments corresponding to a units categorized value which, in turn, corresponds to the cumulative amount of fluid, such a lawn treatment chemical, dispensed between operator resets. Display 16, in turn, displays a cumulative value corresponding, for example, to the total volume of fluid dispensed over an entire day of operation. A mode switch, 20, additionally is provided on enclosure 12 for selectively switching device 10 between a run mode and a calibration mode.

Figure 2:
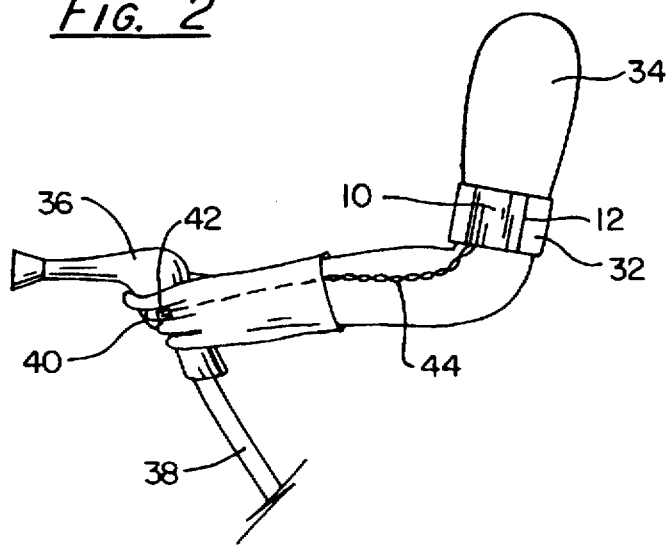
FIG. 2 is a flow diagram illustrating the logic under which system of the present invention is operated.

Looking additionally to FIG. 2, module 10 is illustrated, as being incorporated into a system, shown generally at 30, for monitoring the amount of fluid dispensed from a delivery system. An adjustable strap, 32, is connected to enclosure 12 for portably mounting, as is shown in FIG. 2, module 10 to an arm, 34, or otherwise on the person of an operator. Arm 34 carries a hand-held, spray nozzle, 36, which is connected to a fluid delivery system or tank storage source of fluid, such as in a lawn care track, via a length of conduit or hose, a portion of which is shown at 38. Nozzle 36 is provided as having a trigger, 40, which is actuable by the operator to admit fluid therethrough from conduit 38. An operator switch, shown in phantom at 42, is connected to device 10 via lines 44 as an initial embodiment, and is operably coupled to trigger 40 to be actuated therewith. In another embodiment disclosed later herein, the module 10 will include an R.F. receiver and associated antenna for carrying out its activation. In this regard, the switch 42 is not present for that embodiment, and a fluid flow monitor or switch is provided at the tank storage source or at the truck which responds to the movement of fluid caused by actuation of trigger 40 to, in turn, develop an R.F. link with module 10 to actuate it into operation.

Figure 3:
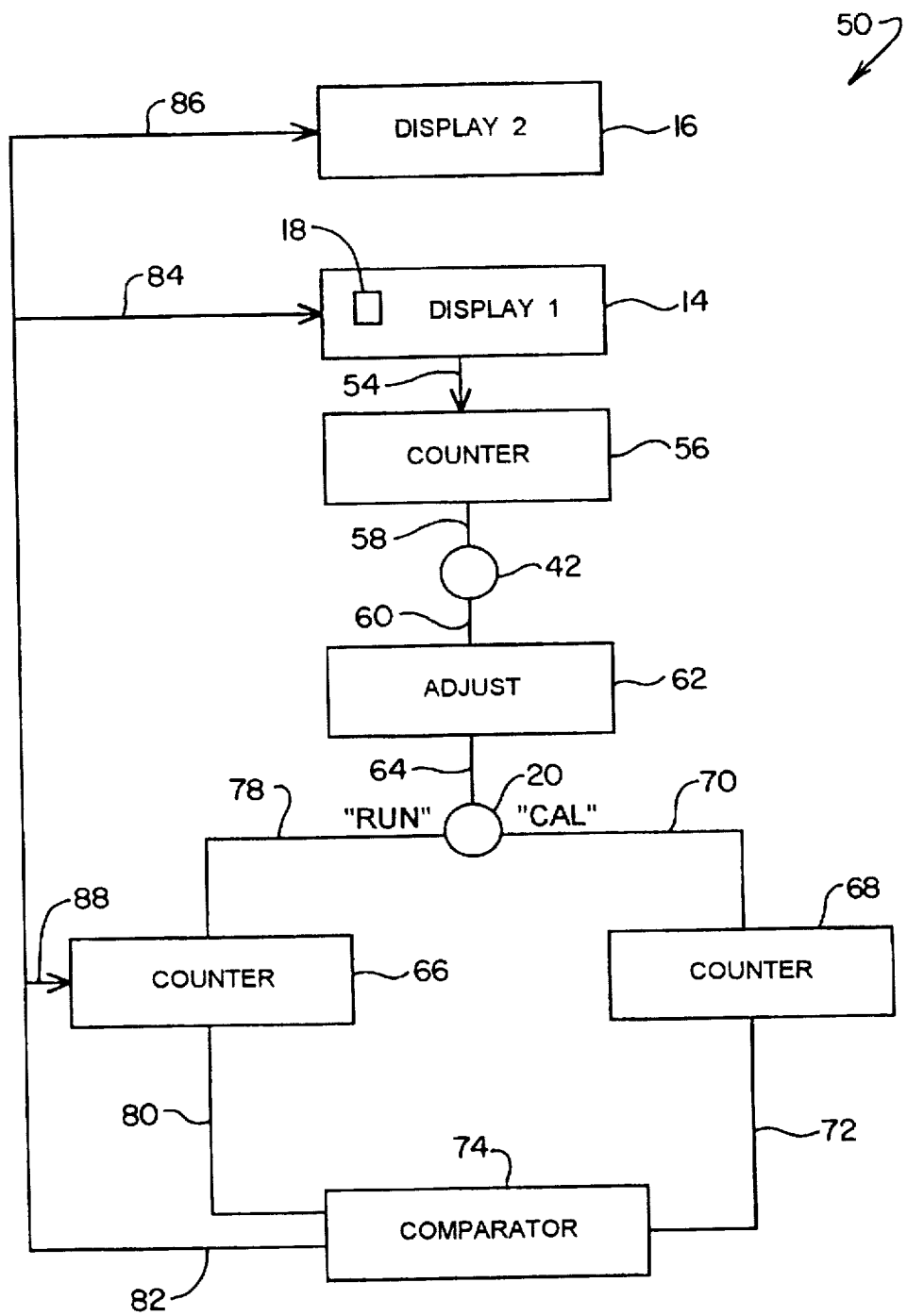
FIG. 3 is a view showing the device of FIG. 1 as integrated into the system of the present invention for monitoring the cumulative amount of fluid dispensed from a delivery system having a hand-held nozzle with a trigger actuable by an operator to admit fluid through the nozzle.

Referring next to FIG. 3, the logic under which the functions of system 30 are controlled is presented in schematic fashion in the flowchart shown generally at 50. Within flowchart 50, first display 14 for displaying the present unit count is shown to provide a clocked output via line 54 to the input of a first counter function or circuit, represented at block 56. The output of fast counter function 56 is connected via line 58 to operator switch 42, which switch is actuated in conjunction with the actuation of trigger 40 of a hand-held spray nozzle 36 (FIG. 2). Operator switch 42 is shown as optionally connected via line 60 to an adjust function, 62, which may be provided for adjusting the clocked output of first counter 56 should it be necessary to accommodate a wide variance in fluid application rates.

The output of adjust function 62 is routed via line 64 to mode switch 20 which may be toggled for selectively providing the clocked output to a second counter function or circuit, represented at block 66, or a third counter function or circuit, represented at 68. With switch 20 toggled to the "CAL" position, the clocked output is provided via line 70 to third counter 68. The output of third counter 68, derived as a calibration count value corresponding to the time elapsed in dispensing a predetermined unit amount of fluid, is received via line 72 as an input of a comparator function, represented at block 74. With switch 20 toggled to the "RUN" position, the clocked output is provided via line 78 to second counter function 66. The output of second counter function 66, which is derived as an incrementing run count value corresponding to the time elapsed in dispensing an amount of fluid, is received via line 80 as another input of comparator function 74. Within function 74, the calibration run count and incrementing run count values are compared to derive an output signal when the run count value equals the calibration count value. This output signal is received via lines 82 and 84, and lines 82 and 86, respectively by first display 14 and second display 16 to increment the units categorized value displayed thereon. Additionally, the output signal is received via line 88 by second counter function 66 which is responsive thereto to reset the incrementing run count value.

Based on the foregoing, it will be appreciated that the functions described in connection with flowchart 50 may be performed with discrete, digital components or circuits. For example, counters 56, 66, and 68 may be provided as a model CD4024 seven-stage ripple carry binary counter available from the National Semiconductor Corporation (NSC). Such commercially-available counters are designed to advance one count on the negative transition of each clock pulse provided at the counter input. Similarly, comparator function 74 may be effected with a 7-bit comparator such as a NSC model MM74HC688, with adjust function 62 effected via a mini dip switch. Additionally, NOR and AND-gates (not shown), such as, respectively, NSC model CD4001 quad 2-input NOR buffered gate, and NSC model CD4071 quad 2-input AND buffered gate, may be incorporated at the output of the reset switch 18 to compensate for propagation time through the circuit, and to debounce operator switch 42.

Figure 4:
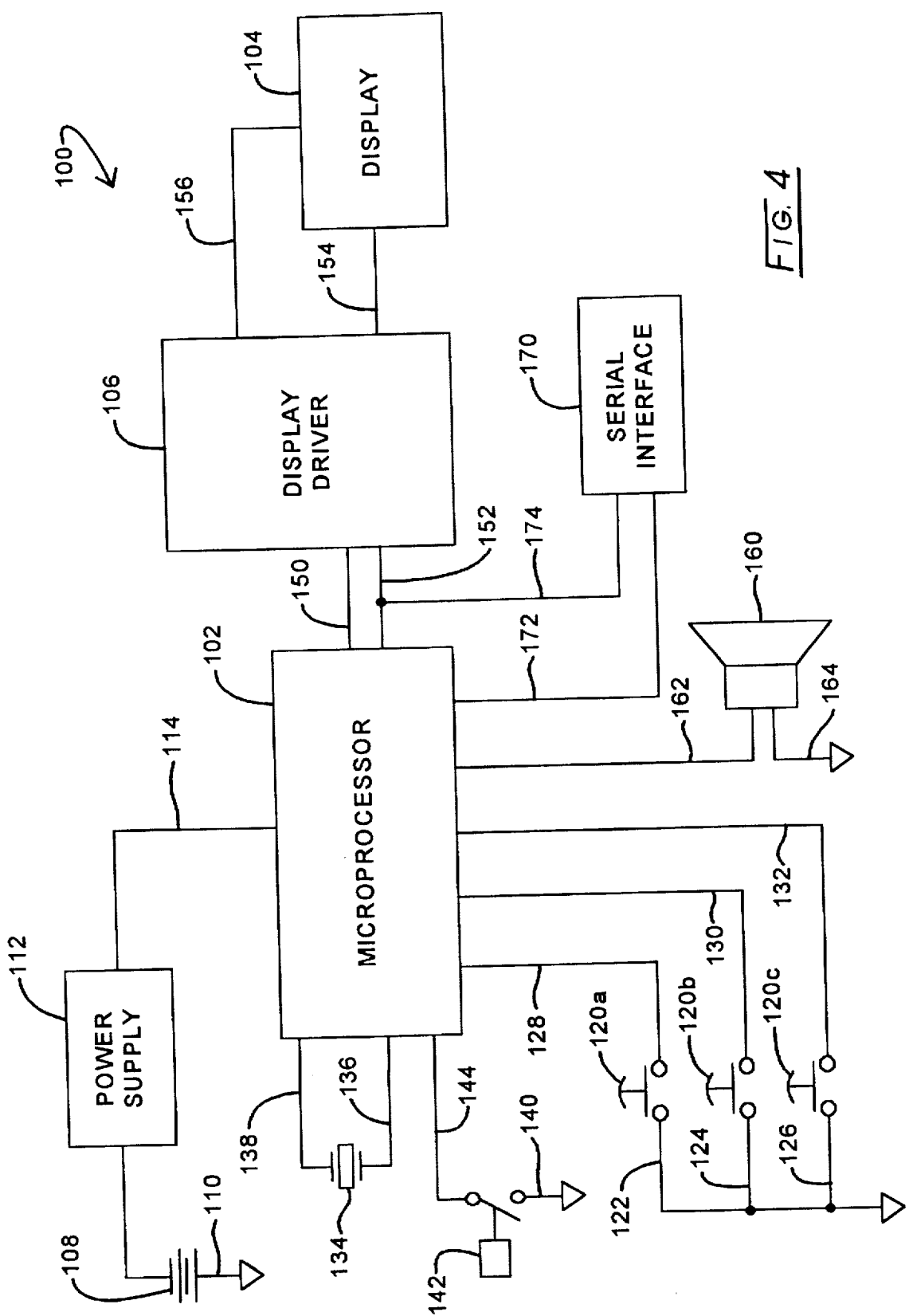
FIG. 4 is a block diagram showing an arrangement of components for effecting the functions of the system of the present invention.

Alternatively, the functions described in connection with flowchart 50 may be performed with a circuit board-mounted, microprocessor-based arrangement such as that shown in FIG. 4 generally at 100. Referring then to FIG. 4, arrangement 100 is shown to include a microprocessor/controller represented at block 102, a display represented at 104, and a display driver represented at block 106. Power to microprocessor 102, display 104, and display driver 106 is portably provided via a battery, 108, which is grounded via line 110, and which is coupled to a power supply voltage regulator represented at block 112. Regulator 112, is coupled via line 114 to microprocessor 102 for supplying current thereto at a constant step-down voltage.

Microprocessor 102 may be provided as having an integrated RAM for digital data storage and an EPROM for storage of firmware having microencoded data acquisition routines and computational algorithms. It will be appreciated that the firmware controlling the operation of microprocessor 102 may be programmed generally in accordance with the flowchart shown at 50 in FIG. 3. The operation of microprocessor 102 additionally is controlled by a parallel set of mode switches, 120a–c, interposed, respectively, between ground lines 122, 124, and 126, and lines 128, 130, and 132 extending to the processor. Switches 120a–c are operator-actuable to perform mode or display time select functions, or reset functions.

The internal clock controlling the timing and counter functions of microprocessor 102 is governed under the resonance of an oscillator, 134, having associated parallel leads 136 and 138. For initiating the counter functions, a switch, 142, is interposed between a ground line, 140, and a lead line, 144, extending to processor 102. Switch 142 corresponds to operator switch 42 of FIG. 2, and may be provided to be a pressure switch operably coupled with trigger 40 (FIG. 2) to be actuated in response to the actuation thereof to provide a signal to processor 102 initiating the selected calibration or run count function. It will be appreciated that although switch 142 is shown to be electrically connected to processor 102, a remote arrangement may be provided wherein an RF or IR signal is provided to the processor as described later herein. Moreover, it further will be appreciated that switch 142 need not necessarily be operably coupled with trigger 40, but alternatively may be provided as having a sensor element to detect the flow of fluid admitted within conduit or hose 38 or nozzle 36 by the actuation of trigger 40.

The clocked output signals derived in processor 102 as corresponding to the calibration or run increment run count values described in connection with flowchart 50 (FIG. 3) are provided via lines 150 and 152 to display driver 106 which, in turn, is coupled via lines 154 and 156 to display 104. Driver 106 and display 104 are responsive to the clocked output signals from processor 102 to display visually perceptible indicia in selected increments corresponding to a units categorized value representing the cumulative amount of fluid dispensed. Likewise, audible indicia corresponding to mode select changes or to selected run count values may be provided, as is shown at 160, with a beeper or other speaker output connected to processor 102 via line 162 and associated ground line 164.

Figure 5:
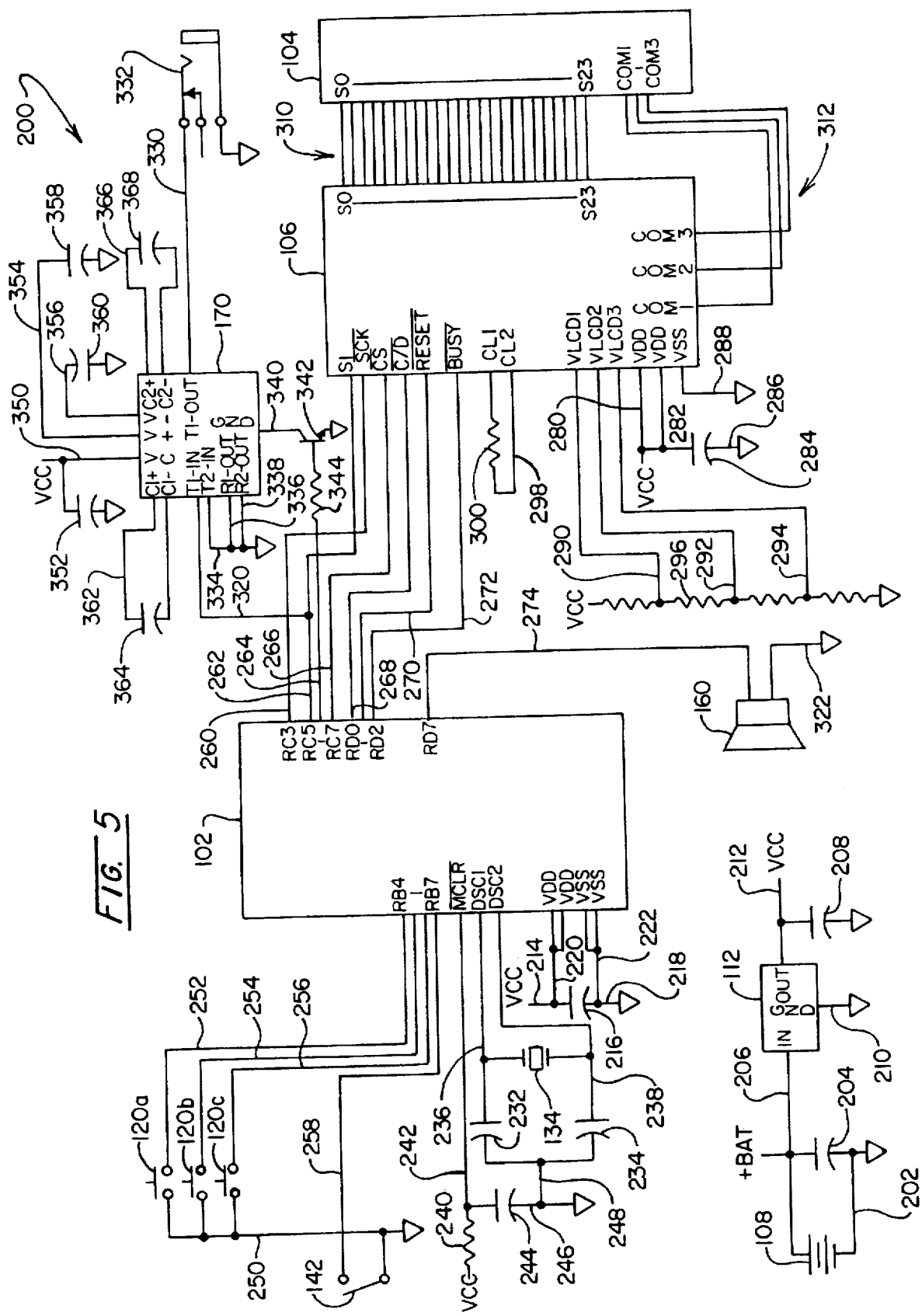
FIG. 5 is a schematic representation of a circuit diagrammed in accordance with the block diagram of FIG. 4.

Should it be desired to download in real time or thereafter the clocked output of processor 102, a serial interface port, such as that represented at block 170, may be connected to processor 102 via lines 172 and 174. Advantageously port 170 affords a capability to interface circuit 100 with an external data storage device such as a personal computer, or with an external printer in order for providing the operator with a hard copy data output Looking next to FIG. 5, a preferred embodiment of circuit 100 is shown generally at 200 to include microprocessor controller 102, display 104, and display driver 106. Again, power to microprocessor 102, display 104, and display driver 106 is portably provided via a battery, 108, which may be a 9 V source and which is grounded via line 202. Battery 108 may have an associated capacitor, 204, coupled in parallel therewith, and itself is coupled to voltage regulator 112 via line 206. Regulator 112, which may be of the step-down type marketed by National under the product designation LP2950CZ-5.0, has an associated capacitor, 208, and is grounded via ground line 210. Line 212 extends from regulator 112 for supplying current to circuit 200 at a constant 5 V output (VCC).

Microprocessor 102, which preferably is provided as a 4 MHz, 8-bit integrated microcontroller such as the type PIC16C64-04/L marketed by Microchip Technology, Inc., of Chandler, Ariz., is supplied voltage VCC at line 214 extending to a bypass capacitor, 216, and ground line 218. Lines 220 and 222 are parallel-coupled and extend, respectively, to pins VDD and VSS, providing a positive supply to the logic and I/O pins of processor 102, and to ground reference pins VSS. As aforementioned, the internal clock controlling the timing and counter functions of microprocessor 102 is governed under the resonance of oscillator 134 which may be provided as a 4 MHz, ceramic resonator such as that marketed under the product designation CSA4.00MTF10 by Murata. Oscillator 134 has a pair of associated capacitors, 232 and 234, and is coupled to oscillator crystal input and output pins OSC1 and OSC2 via, respectively, fines 236 and 238. Voltage VCC additionally is supplied at master clear (reset) input/programming voltage input pin MCLR via current limiting resistor 240 and line 242. A bypass capacitor, 244, is coupled to line 242 via ground line 246, and to capacitors 232 and 234 via line 248.

Input signals to processor 102 are provided by mode switches 120a–c which are operator-actuable to initiate mode select, display time select, or reset functions. Switches 120a–c are shown connected via ground line 250 and, respectively, lines 252, 254, and 256 to interrupt on change pins RB4–6 of microprocessor 102. For initiating the counter functions, pressure switch 142 corresponding to operator switch 42 of FIG. 2, is connected via ground line 250 and line 258 to interrupt on change pin RB7 connected to processor 102.

The clocked signals derived in processor 102 as corresponding to the calibration or run increment run count values described in connection with flowchart 50 (FIG. 3) are outputted from bidirectional I/O port pins RC3, RC5–7, RD0–2, and RD7, each having an associated lead line, 260, 262, 264, 266, 268, 270, 272, and 274, respectively. In this regard, data input from processor 102 is received via line 262 at serial input (active high) pin SI of display driver 106. Display driver 106, which may be provided as an IC LCD driver of the type marketed by NEC Electronics of Mountain View, Calif., under the product designation uPD7225G-00, is serially (8-bit) interfaced with host microprocessor 102. The 8-bit serial data transfer from processor 102 to display driver 106 is enabled with input received at chip select input (active low) pin CS0 thereof which is coupled via line 266 to pin RC7 of processor 102, and is synchronized with input received at serial clock input (active low) pin SCK which is coupled to pin RC3 of processor 102 via line 260. Busy output (active low) pin BUSY of driver 106 is coupled to pin RD2 of processor 102 via line 272 to indicate that the driver is ready to receive the next data input byte. To distinguish a serially input data byte as a command or display data, input is received at command/data select input (active both high and low) pin C/D of driver 106 which is coupled to pin RD0 of processor 102 via line 268. The interface between processor 102 and driver 106 is completed with the connection via line 270 of reset input (active low) pin RESET of driver 106 with pin RD1 of processor 102. Pin RESET receives an R/C or pulse to initialize driver 106 after power-up.

Driver 106 is supplied voltage VCC at lines 280 and 282 extending to pins VDD for providing a positive power supply, and to an associated bypass capacitor, 284, via ground line 286. A ground reference to driver 106 is provided via ground line 288 which is connected to ground reference pin VSS. An LCD bias voltage is supplied to driver 106 at lines 290, 292, and 294 from the voltage ladder, 296, connected across pins VLCD1-3. The inputs to driver 106 are completed with connection of system clock output (active high) pin CL2 to CL1 via line 298 and an associated resistor, 300.

As is shown by the pin connections represented at 310 and 312, display 104, which preferably is an 8 digit, 7 segment LCD type marketed by Excel under the product number 8200E, is interfaced with driver 106 via the connection of LCD segment driver output pins S0-23 and LCD backplane driver output pins COM1-3 thereof with the corresponding input pins S0-23 and COM1-3. As aforementioned, driver 106 and display 104 are responsive to the clocked output signals from processor 102 to display visually perceptible indicia in selected increments corresponding to a units categorized value representing the cumulative amount of fluid dispensed.

Returning to processor 102, the clocked signals derived therein additionally are outputted via I/O pin RD7 and line 274 to beeper 160 for providing audible indicia corresponding to mode select changes or to selected run count values, and via pin RC5 and lines 262 and 320 to serial port 170 for interfacing processor 102 with an external device such as a printer or host computer. Beeper 160 has an associate ground line, 322, and may be a piezoelectric annunciator such as that marketed by Projects under the product number AI-175.

Serial port 170 preferably is provided as an RS-232 interface driver/receiver of the type marketed under the product designation MAX232CWE by Maxim Integrated Products, Inc., of Sunnyvale, Calif. TTL/CMOS input from processor 102 is received by port 170 at pin T1-IN, and is provided as an RS-232 output at pin T1-OUT via line 330 extending, for example, to a phone jack, 332, such as model MDCP2ARA sold by Swithcraft. TTL/CMOS input pin T2-IN and output pins R1-OUT and R2-OUT are grounded, respectively, via lines 334, 336, and 338. Ground pin GND is grounded via line 340 which extends to a transistor, 342, which may be of an npn-type such as that sold by Motorola under the product designation MPS3904. The current flow from transistor 342 is modulated via the output provided at the base thereof by line 264 and associated resistor 344 which extend from I/O pin RC6 of processor 102. Voltage VCC is supplied at pin VCC via line 350 which has an associated bypass capacitor, 352, with pins V+ and V− grounded, respectively, via lines 354 and 356, and associated bypass capacitors 358 and 360. A voltage doubling is effected by the connection of doubler pins C1+ and C1− via line 362 and capacitor 364, with a voltage inversion being effected by the connection of inverter pins C2+ and C2− via line 366 and capacitor 368.

Returning to FIGS. 1-3, next considered is the general operation of system 30 of the present invention. With the display apparatus 10 energized, mode switch 20 is toggled to its calibrate position, and switch 18 is depressed to reset display 14. A calibration container (not shown) then is selected as having the desired display calibration count volume, e.g., one gallon. As trigger 40 of spray nozzle 36 is squeezed, operator switch 42 is actuated or a broadcast link is established to generate a calibration count value in counter function 68 corresponding to the time elapsed in dispensing a unit volume of fluid required to fill the selected calibration container. Once the calibration container has been filled, switch 20 is toggled to its run position, and switch 18 is depressed to again reset display 14. With switch 20 in the run position, an incrementing run count value is generated by counter function 66 responsive to the actuation of trigger 40 and operator switch 42 and corresponding to the time elapsed in dispensing an amount of fluid from nozzle 36. As noted, switch 42 may be replaced with a broadcast link, i.e. an R.F. signal. Comparator function 74 compares this run count value to the calibration count value previously derived, and, in turn, derives a control signal pulse or output upon reaching a state wherein the outputs of counter function 66 and counter function 68 are equivalent. This pulse is provided to reset counter function 66 via line 88, and simultaneously to displays 14 and 16. The displays are responsive to the pulse to increment the units categorized value being displayed to indicate the cumulative amount of fluid which has been dispensed through nozzle 36. During a normal course of operation, the operator will monitor the amount of fluid, such as a lawn treatment chemical or the like, by periodically referring to displays 14 and 16 of device 10 which may be worn or otherwise carried on his or her person. As each subsequent unit of fluid is dispensed, the displays 14 and 16 are correspondingly incremented, and continue to display the incrementing count until reset.

As noted earlier herein, in another embodiment of the invention, the switch 42 is described in FIG. 2 and as further elaborated upon in FIG. 4, may be supplanted with a boardcast link, for example an R.F. link. With such an arrangement, a fluid flow detection switch or monitor may be mounted at the tank source of fluid carried, for example, by a lawn care truck. When the operator causes fluid flow through the nozzle, the movement of such fluid through the conduit extending from the track is detected and an R.F. signal is broadcast to the module 10 strapped to the operator arm. In general, all other functions of the system remain the same.

Figure 6:
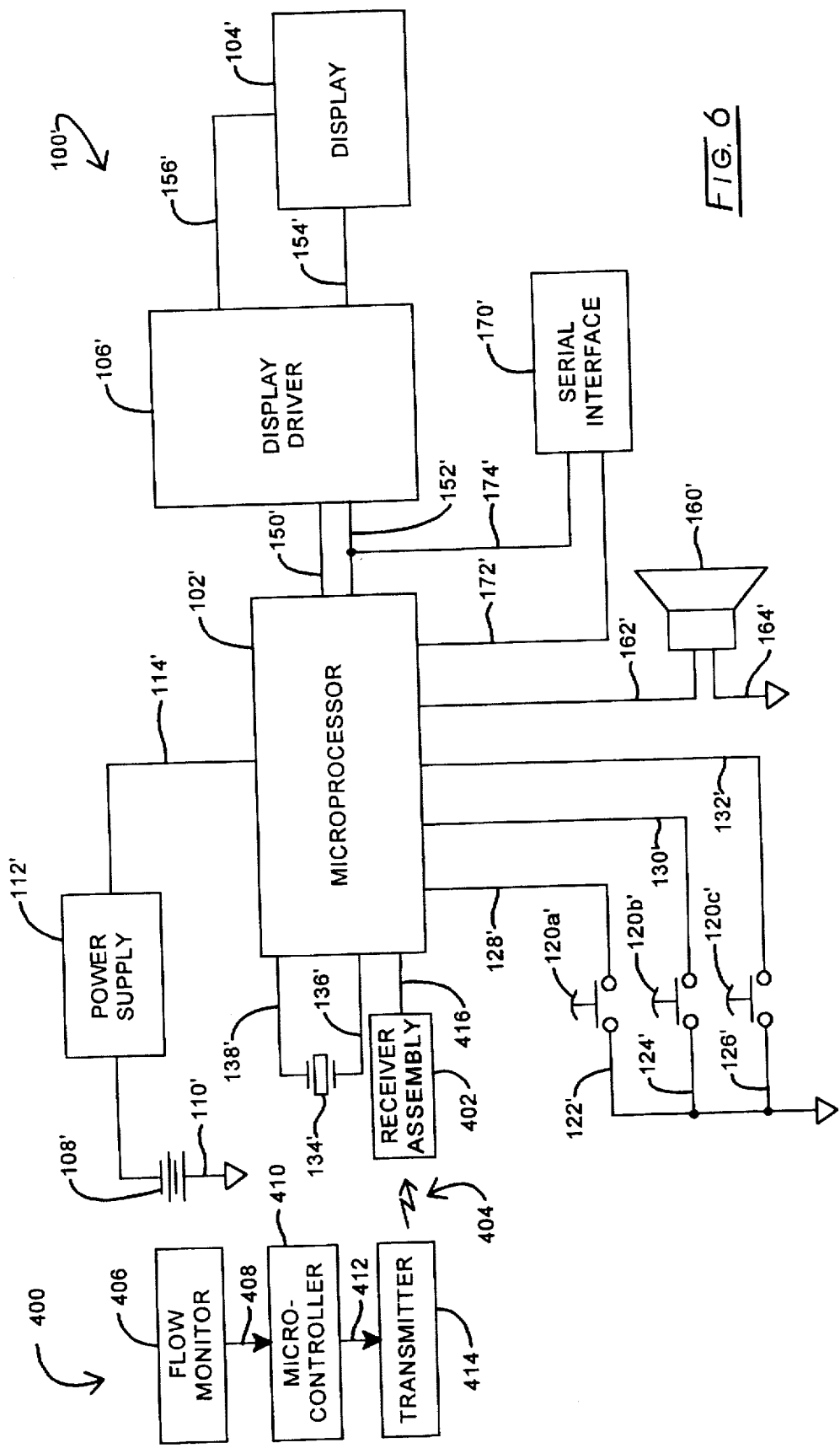
FIG. 6 is a block diagram similar to FIG. 4 but showing an embodiment of the invention wherein an R.F. transmitter is utilized to actuate the portable flow analyzer module of the invention.

Referring to FIG. 6, the principal components of FIG. 4 are seen reproduced with the exception that switching components 140, 142, and 144 are replaced with a transmitter module represented generally at 400 and a receiver assembly represented generally at 402. The module 400 and assembly 402 communicate via a broadcast link, herein shown as an R.F. broadcast link represented generally at 404. All of the remaining components shown in FIG. 6 are identical to those earlier described in connection with FIG. 4. Accordingly, those remaining components are provided the same numerical designation but in primed fashion.

Transmitter module 400 is seen to include a flow monitor or transducer 406 which may be provided, for example, as a pressure switch or flow meter. With the operator actuation of trigger 42, the fluid flow monitoring transducer 406 will detect the movement of fluid through those conduits associated with the tank source at a truck such as at conduit 38 shown in FIG. 2, and provide a flow signal at line 408. When the operator releases the trigger 40, the flow signal disappears. That flow signal at line 408 is introduced to a microcontroller 410. Microcontroller 410 responds to this input at line 408 to generate a serial message string or message signal carrying the basic information that fluid is flowing or is not flowing. This message is presented at line 412 and is directed to a transmitter 414 which responds to the message signal and carries out the broadcasting thereof to establish the broadcast link 404, for example as an R.F. broadcast link. The receiver assembly 402 is mounted upon module 10, for example within its enclosure, and responds to the broadcasted message signal to complete the link 404 and derive a digital signal corresponding therewith which is presented at line 416 to microprocessor 102'. In general, the input will be to a serial port of the device 102'. The system then performs as described above in the embodiment of FIGS. 1-5.

Looking to FIG. 7, the components of the transmitter module 400 are revealed in expanded scale. In this regard, the conduit 38 is shown in conjunction with a fluid flow represented at arrow 418. A constriction in the flow at conduit 38 is shown in conjunction with a flow switch symbol at 406. Transducing device 406 will provide a flow signal at line 408 representing the presence or absence of flow, and this line 408 is directed to the input of microcontroller 410. Preferably, in addition to providing the flow or no flow data at line 412, the microcontroller 410 also provides a message signal as a data stream corresponding with the elapsed time of the presence of fluid flow through conduit 38. This serial message stream then at line 412 is directed to transmitter 414 for broadcasting from antenna 418. The transmitter 414 is one selected as complying with the provisions of Part 15 of the Regulations of the Federal Communications Commission (FCC). The R.F. link 404 developed may, for example, be of a UHF variety with amplitude shift keying (ASK). Where more extended ranges are called for, then a 900 megahertz band with either amplitude shift keying (ASK) or frequency shift keying (FSK) may be employed. Such frequencies are employed, for example, with cellular telephone systems. Alternately, a 900 mHz spread spectrum may be employed where the broadcasting is spread across a number of frequencies. This permits enhanced power and avoids external interference with the link 404. As noted earlier, module 400 is mounted at the fluid source tank location, for example, upon a lawn care truck.

Looking to FIG. 8, the R.F. link 404 again reappears as being received by the receiver assembly 402 at an area represented symbolically at 422. This completes the R.F. link 404 and a digital message signal is derived in correspondence therewith and provided to the microcontroller or processor 102' as represented at line 416. The methodology above described then is carried out by the components of the portable flow analyzer module 10' as revealed in connection with FIGS. 4 and 5. Those components of the module 10' withdrawing with FIG. 4 are represented in the drawing with the same numeration in primed fashion.

Since certain changes may be made in the above system, apparatus, and method without departing from the scope of the invention herein involved, it is intended that all matter contained in the above description or shown in the accompanying drawings shall be interpreted as illustrative and not in a limiting sense.

What is claimed:

1. A system for displaying a units categorized value corresponding to the cumulative amount of fluid dispensed from a delivery system having a tank storage source of said fluid, a fluid conduit and a hand-held nozzle with a trigger actuable by an operator to admit fluid through the nozzle from said conduit, said system comprising:
   (a) a transmitter module including:
      a fluid flow monitoring transducer positioned at said source and responsive to the flow of fluid through said conduit to provide a flow signal,
      a controller positioned at said source and responsive to said flow signal to derive a message signal, and
      a transmitter assembly responsive to said message signal to effect the broadcasting thereof to establish broadcast link; and
   (b) a portable flow analyzer module, including:
      an enclosure,
      a receiver assembly mounted upon said enclosure and responsive to said broadcasted message signal to complete said broadcast link and derive a digital message signal corresponding therewith,
      a display mounted upon said enclosure responsive to a control signal for displaying visually perceptible indicia in selected increments corresponding to said units categorized value; and
      a control circuit within said enclosure for deriving said control signal, said control circuit comprising:
         a first circuit responsive to said digital message signal to generate a clocked output,
         a second circuit responsive in a calibration mode to said clocked output for generating a calibration count value corresponding to the time elapsed in dispensing a predetermined unit amount of fluid,
         a third circuit responsive in a run mode to said clocked output for generating an incrementing run count value corresponding to the time elapsed in dispensing an amount of fluid, and
         a comparator circuit connected to said second and said third circuits and to said display for comparing said incrementing run count value and said calibration count value to derive said control signal incrementing said units categorized value when said count value equals said calibration count value.

2. The system of claim 1 further comprising a display reset switch connected to said display, said reset switch being actuable by the operator to reset said display.

3. The system of claim 1 further comprising a holder assembly for portably mounting said enclosure upon the operator.

4. The system of claim 1 further comprising a mode switch connected to said control circuit and operable between a run mode position and a calibration mode position for switching said control circuit between said run mode and said calibration mode.

5. The system of claim 4 wherein said third circuit is responsive to said control signal to reset said incrementing run count value.

6. The system of claim 1 wherein said controller positioned at said source derives said message signal to correspond with the presence of fluid flow through said conduit.

7. The system of claim 6 wherein said controller positioned at said source derives said message signal further to correspond with the elapsed time of a presence of fluid flow through said conduit.

8. A method for displaying a units categorized value corresponding to the cumulative amount of fluid dispensed from a delivery system having a tank storage source of said fluid, a fluid conduit, and a hand-held nozzle with a trigger actuable by an operator to admit fluid through the nozzle from the conduit, said units categorized value being displayed in selected increments as visually perceptible indicia and said method comprising the steps of:
   providing a transmitter module including a fluid flow monitoring transducer positioned at said source and responsive to the flow of fluid through said conduit to provide a flow signal, a controller positioned at said source, responsive to said flow signal to derive a message signal, and a transmitter assembly responsive to said message signal to effect the broadcasting thereof to establish a broadcast link;
   providing a portable flow analyzer module having a receiver assembly responsive to said broadcasted message signal to complete said broadcast link and derive a digital message signal corresponding therewith to actuate said analyzer module into an operating state;
   carrying out a first actuation of said trigger to establish said broadcast link;
   deriving responsive to said first actuation of said trigger a calibration count value corresponding to the time elapsed in dispensing a predetermined unit amount of fluid;

carrying out a second actuation of said trigger to re-establish said broadcast link;

deriving responsive to a said second actuation of said trigger an increment run count value corresponding to the time elapsed in dispensing an amount of fluid;

comparing said incrementing run count value and said calibration count value; and incrementing said units categorized value when said incrementing run counter value output equals said calibration count value output.

9. The method of claim 8 further comprising the steps of:

resetting said incrementing run count value; and deriving responsive to said second actuation of said trigger an increment run count value corresponding to the time elapsed in dispensing an amount of fluid.

10. A system for displaying a units categorized value corresponding to the cumulative amount of fluid dispensed from a delivery system having a tank storage source of said fluid, a fluid conduit and a hand-held nozzle with a trigger actuable by an operator to admit fluid through the nozzle from said conduit, said system comprising:

(a) a transmitter module including:

a fluid flow monitoring transducer positioned at said source and responsive to the flow of fluid through said conduit to provide a flow signal, a controller positioned at said source and responsive to said flow signal to derive a message signal, and a transmitter assembly responsive to said message signal to effect the broadcasting thereof to establish broadcast link; and (b) a portable flow analyzer module including:

an enclosure, a receiver assembly mounted upon said enclosure and responsive to said broadcasted message signal to complete said broadcast link and derive a digital message signal corresponding therewith, a display mounted upon said enclosure responsive to a control signal for displaying visually perceptible indicia in selected increments corresponding to said units categorized value; and a processor within said enclosure for deriving said control signal, said processor being responsive in a calibration mode to said digital message signal count value corresponding to the time elapsed in dispensing a predetermined unit amount of fluid, and being responsive to a run mode to derive an incrementing run count value corresponding to the time elapsed in dispensing an amount of fluid, and to compare said incrementing run count value and said count value for deriving said control signal incrementing said units categorized value when said run count value equals said calibration count value.

11. The system of claim 10 further comprising a mode switch connected to said processor, said mode switch operable between a run mode position and a calibration mode position for switching said processor between said run mode and said calibration mode.

12. The system of claim 10 wherein said processor is responsive to the derivation of said control signal to reset said run count value.

13. The system of claim 10 further comprising a display reset switch connected to said display, said reset switch being actuable by the operator to reset said display.

14. The system of claim 10 further comprising a holder assembly for portably mounting said enclosure upon the operator.

* * * * *